United States Patent
Rumpf et al.

(10) Patent No.: US 8,427,751 B2
(45) Date of Patent: Apr. 23, 2013

(54) COMBINER POSITIONING SYSTEM FOR HEAD-UP DISPLAY

(75) Inventors: Horst Rumpf, Hsinchu (TW); Christian Hopf, Hsinchu (TW); Alexander Noel, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 122 days.

(21) Appl. No.: 13/004,884

(22) Filed: Jan. 12, 2011

(65) Prior Publication Data
US 2012/0176683 A1 Jul. 12, 2012

(51) Int. Cl.
G02B 27/14 (2006.01)
G09G 5/00 (2006.01)

(52) U.S. Cl.
USPC ............... 359/632; 359/630; 359/631; 345/7

(58) Field of Classification Search .............. 359/630, 359/631, 822; 345/7–9; 296/70; 40/593
See application file for complete search history.

(56) References Cited

U.S. PATENT DOCUMENTS

| | | | | |
|---|---|---|---|---|
| 5,065,976 A | * | 11/1991 | Woody | 248/549 |
| 5,457,575 A | * | 10/1995 | Groves et al. | 359/631 |
| 5,677,701 A | * | 10/1997 | Okuyama et al. | 345/7 |
| 6,000,076 A | * | 12/1999 | Webster et al. | 5/618 |
| 6,226,816 B1 | * | 5/2001 | Webster et al. | 5/618 |
| 6,504,518 B1 | * | 1/2003 | Kuwayama et al. | 345/7 |
| 6,542,305 B2 | * | 4/2003 | Nakamura et al. | 359/630 |
| 6,657,789 B2 | * | 12/2003 | Nakamura et al. | 359/632 |
| 2008/0285138 A1 | | 11/2008 | Lebreton | |
| 2009/0086329 A1 | | 4/2009 | Potakowskyj et al. | |

FOREIGN PATENT DOCUMENTS

| | | |
|---|---|---|
| JP | 2005-153723 | 6/2005 |
| JP | 2006-036018 | 2/2006 |
| JP | 2007-302195 | 11/2007 |
| JP | 2009-515768 | 4/2009 |

OTHER PUBLICATIONS

"Office Action of Japan counterpart application" issued on Jan. 22, 2013, p. 1-p. 3, in which the listed references were cited.

* cited by examiner

*Primary Examiner* — Loha Ben
(74) *Attorney, Agent, or Firm* — Jianq Chyun IP Office

(57) ABSTRACT

A combiner positioning system for a head-up display (HUD) is provided. The positioning system includes a combiner holder, a pair of control discs, a pair of levers and a driving unit. The combiner holder is connected to the combiner, the levers are connected to the combiner holder and the control discs, and the driving unit is connected to the control discs. When the driving unit drives the control discs to rotate, the levers moves the combiner holder and the combiner. The positioning system enables the combiner's first movement from parking position (storage position) to operating position (display position) and a second movement for angular fine adjustment of the combiner is also enabled after reaching the operating position.

15 Claims, 8 Drawing Sheets

COMBINER POSITIONING SYSTEM FOR HEAD-UP DISPLAY

BACKGROUND OF THE INVENTION

1. Field of the Invention

The present invention generally relates to positioning systems. More particularly, the present invention relates to a positioning system used for a combiner minor of a head-up display system.

2. Description of Related Art

A head-up display or HUD is a transparent display that presents data without requiring users to look away from their usual viewpoints. Although they were developed for just military aviation in the earlier time, it is becoming common that using HUDs in commercial aircraft, automobiles and other applications. A typical HUD contains three primary components: a combiner, a projector unit and a video generation computer. The combiner is a semi-transparent mirror that is positioned in front of the pilot/driver to display the virtual picture with the required information, i.e., a pilot/driver can see the view in front of the aircraft/vehicle through the combiner of the HUD. Combiners can be concave or flat, and usually have a special coating that reflects the monochromatic light projected onto it from the projector unit while allowing all other wavelengths of light to pass through. On some aircrafts, the combiners are easily removable or can be rotated out of the way by aircrew. The projection unit projects the image onto the combiner for the user to view. Projection units can be either below or above the combiners. The computer provides the required information/data to be displayed.

Some mechanisms of combiner positioning for a HUD have already been known in the art. A retractable combiner is disclosed in US patent Pub. No. 2008/0285138 A1. In such kinematic mechanisms, the combiner is stored in a protected housing when it is in a parking position. The combiner is mounted on a movable supporting frame which is displaceable between the parking position and an operating position. The combiner is retracted back into the housing in the parking position and extended to the external of the housing in the operating position.

Another combiner positioning mechanism is proposed in US patent Pub. No. 2009/0086329 A1. In the combiner positioning system of this article, the system is arranged on a frame including a base plate. A movable carrier is provided for supporting the combiner within the frame and it is movable between the parking position where the combiner is in a retracted position and the operating position where the combiner is in a fully extended position. The movable carrier is driven by a screw spindle coupled to a stepping motor. The movement is guided by side walls with cams and teeth to drive a synchronous movement. It includes the possibility for angular fine adjustment of combiner position when the combiner is in the operating position.

Still, the required space for such a kinematic mechanism of combiner positioning system including many parts for accurate movement limits the possibilities for reduced outline of the HUD. The design does not offer the wished flexibility to follow requirements for dashboard and different windshields from car makers. Additionally, the two major functions, combiner movement and combiner adjustment are strongly linked with each other. Therefore, the maximum speed of combiner movement cannot be increased without compromising the resolution of combiner adjustment.

Thus, capability of fine adjustment is also very important for the kinematic mechanisms of combiner positioning. Sometimes, the virtual images displayed on the combiner cannot be read with the same ease when the position of the combiner s not in a best condition. The small distances between the user of a vehicle and the combiner and size differences between the vehicle users may bring about the requirement of accuracy of the combiner positioning system.

SUMMARY OF THE INVENTION

Accordingly, the present invention is directed to a positioning system for a combiner of head-up displays. The positioning system is arranged in a casing including a fixing frame on the base. A lifting module supporting a combiner is disposed within the casing and including a combiner holder, a pair of control discs, a pair of levers and a driving unit. The combiner holder is connected to the combiner, the levers are connected to the combiner holder and the control discs, and the driving unit is connected to the control discs. When the driving unit drives the control discs to rotate, the levers move the combiner holder and the combiner. The lifting module is capable of doing a first movement between a first position where the combiner is in a parking position (storage position) and a second position where the combiner is in an operating position (display position), and a second movement for angular fine adjustment of the combiner after reaching the operating position.

The present invention is directed to a kinematic system which enables movement of the combiner from parking position to operating position by lifting the combiner with a pair of lifting levers. The levers are opposed from each other and each includes a first end, a second end and a pin. The first ends are rotatably mounted on the fixing frame. The second ends are connected to the combiner holder. The pins of the levers are attached to the control discs, respectively.

According to an embodiment of the present invention, the combiner holder is symmetrically designed and includes two upper tips, two pins and two lower pins. The upper tips are fixedly attached to the bottom ends of the combiner and together with the second ends of the levers. The pins are movably connected to the fixing frame.

The lifting levers are controlled by the control discs respectively. The control discs are opposed from each other and arranged generally vertical to the base, respectively positioned adjacent to each of the levers. Each of the control discs includes a predetermined curve slot implemented on the body of the control disc. Each of the levers is connected with the control discs by the pin attached to the predetermined curve slot. Subsequently, the pins of the lifting levers are adapted to move along the predetermined curve slot to accomplish the movement of the combiner.

The control discs are rotatably connected to the driving unit. The driving unit is disposed on the fixing frame between the control discs and includes a stepping motor equipped with a worm gear. The worm gear is assembled to a shaft and rotatably connected to the control disc.

When the combiner is in the parking position, as soon as the stepping motor is started, the worm gear will drive the control discs to rotate. As the control discs rotate, the second ends of lifting levers will lift the combiner holder together with the combiner to move to the operating position.

The driving unit further includes a pair of gear wheel segments and a pair of gear racks for the second movement. The gear wheel segment is connected to the control disc. The gear rack is symmetrically disposed on a rail of the fixing frame. The gear rack is disposed on the rail and the gear rack moves with one degree of freedom.

While the lifting module reaches the operating position, the control discs will continue to rotate, and the lifting levers will keep in the position by the constant curvature of the predetermined curve slots. Simultaneously, the gear wheel segment gets in contact with the gear rack and drives the gear rack to move along the rail to hit the lower pin to rotate the combiner holder for the second movement.

In order to let the combiner holder move steadily and smoothly, a pair of predetermined guiding slots are designed on the wall of fixing frame. The pins of the combiner holder are movably connected to the predetermined guiding slots.

For offering a backlash free adjustment movement of the kinematic mechanism, a spring is attached to the combiner holder. The spring is fixedly attached between the fixing frame and the lower pin of the combiner holder.

It is to be understood that both the foregoing general descriptions and the following detailed descriptions are exemplary, and are intended to provide further explanation of the invention as claimed.

The above and other features of the present invention will be better understood from the following detailed description of the preferred embodiments of the invention that is provided in communication with the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
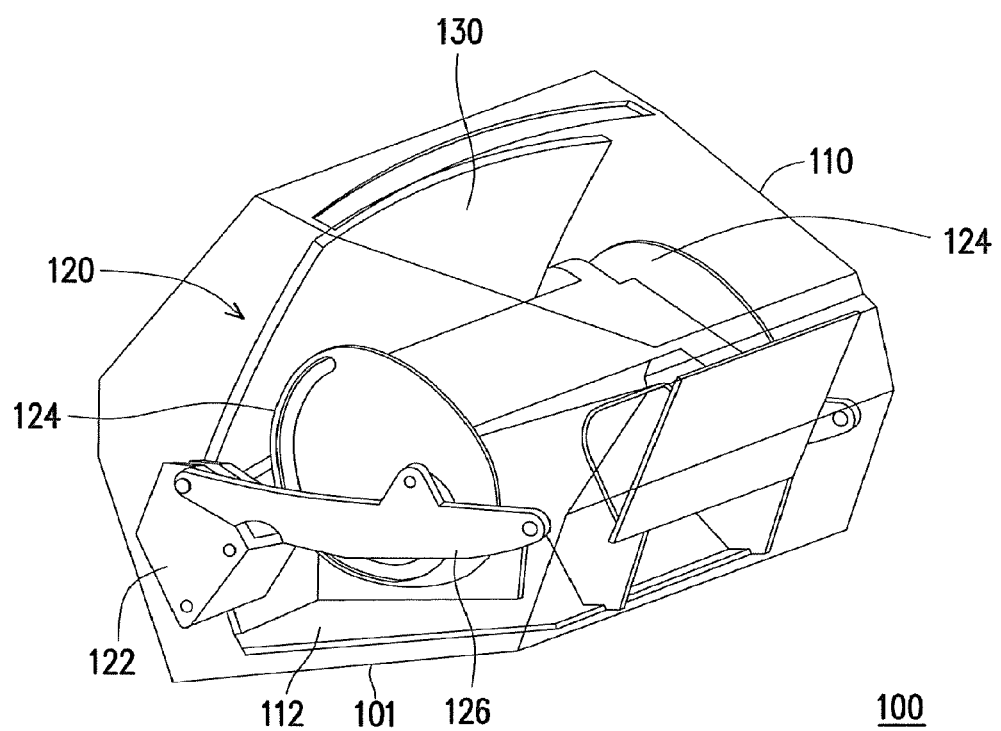
FIGS. 1A-1C respectively illustrate the combiner is in a parking position, an operating position and angular fine adjusting movement of the combiner.

Reference will now be made in detail to the present preferred embodiments of the invention, examples of which are illustrated in the accompanying drawings. Wherever possible, the same reference numbers are used in the drawings and the description to refer to the same or like parts.

The figures are not drawn to scale and they are provided merely to illustrate the present invention. Several aspects of the invention are described below with reference to example applications for illustration. It should be understood that numerous specific details, relationships and methods are set forth to provide a full understanding of the invention. The present invention may be embodied in many different forms and should not be construed as limited to the embodiments set forth herein. For example, the present invention can be embodied as a method or a system.

The present invention provides a kinematic positioning system for combiner of head-up display. The positioning system enables a first movement and a second movement of the combiner. The first movement is the movement between a first position where the combiner is in a parking position (storage position) and a second position where the combiner is in an operating position (display position). The second movement is the movement for angular fine adjustment of the combiner after the combiner reaching the operating position.

Figure 1B:
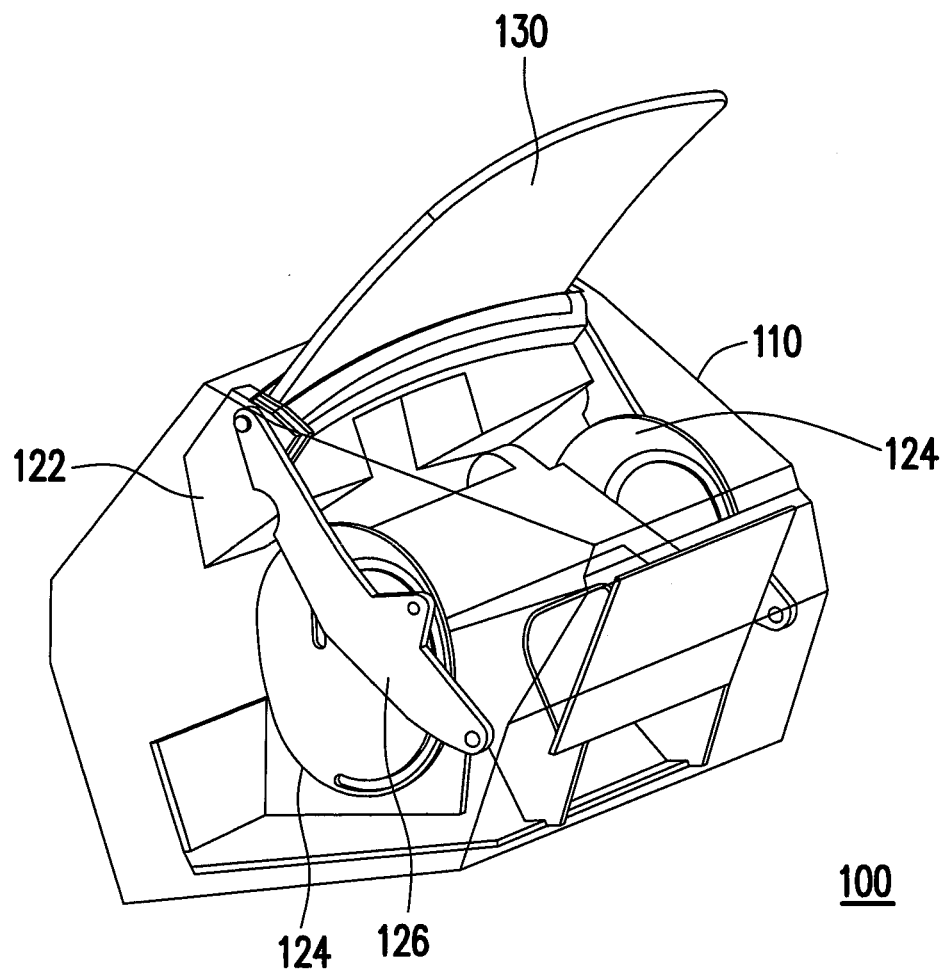
Figure 1C:
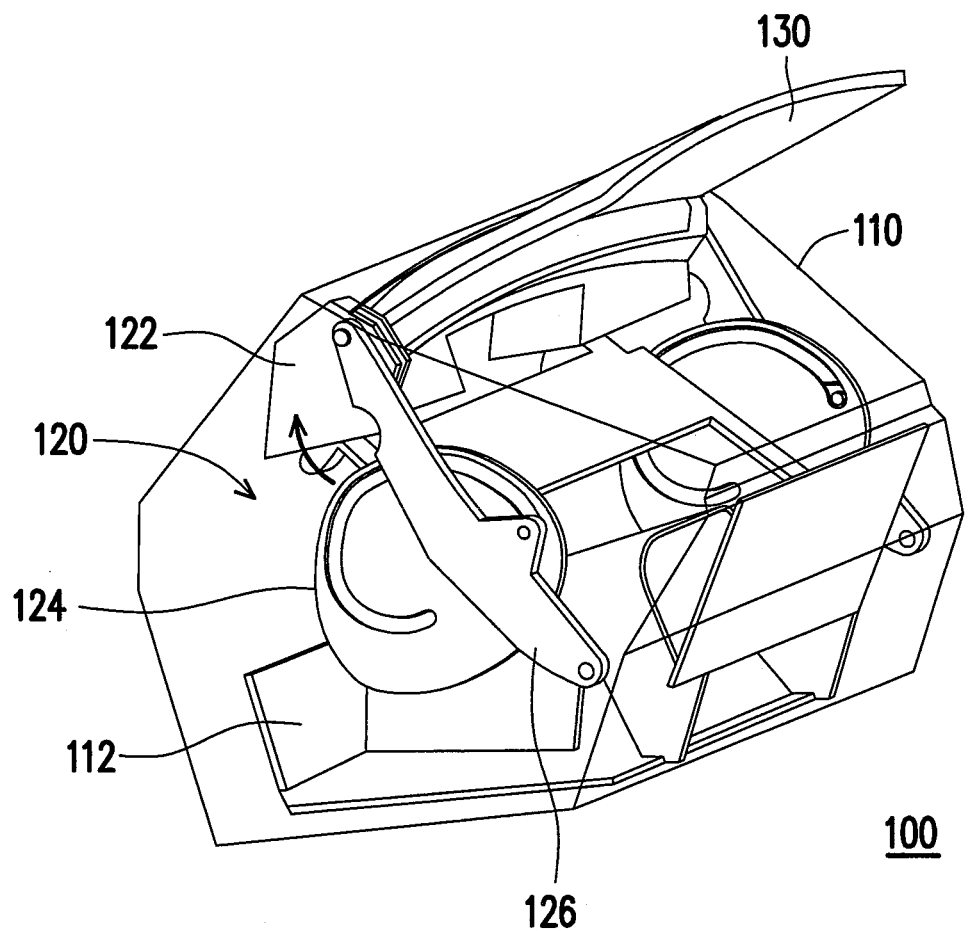

The function for angular fine adjustment of the combiner is implemented in the positioning system for correction of the image depending on user height and by that his eye position. The basic features and operation of the positioning system 100 are shown in FIGS. 1A, 1B and 1C. FIGS. 1A-1C illustrate the features and operation of the combiner positioning system including the parking position, operating position and angular fine adjusting movement of the combiner. As illustrated therein, the positioning system 100 mainly includes a casing 110 and a lifting module 120. In a parking position, the combiner 130 can be fully retracted within the casing 110. The casing 110 herein protects all the parts of positioning system 100 from contamination like dust, slops and dirt, etc. Unexpected impacts are also resisted by the casing 110. When the positioning system 100 is in use, the combiner 130 is extended from the interior of the casing 110. The combiner 130 fully extended to the operating position where it is ready for use is illustrated in FIG. 1B. After reaching the operating position, the combiner 130 is capable for angular fine adjustment and is shown in FIG. 1C.

Figure 2:
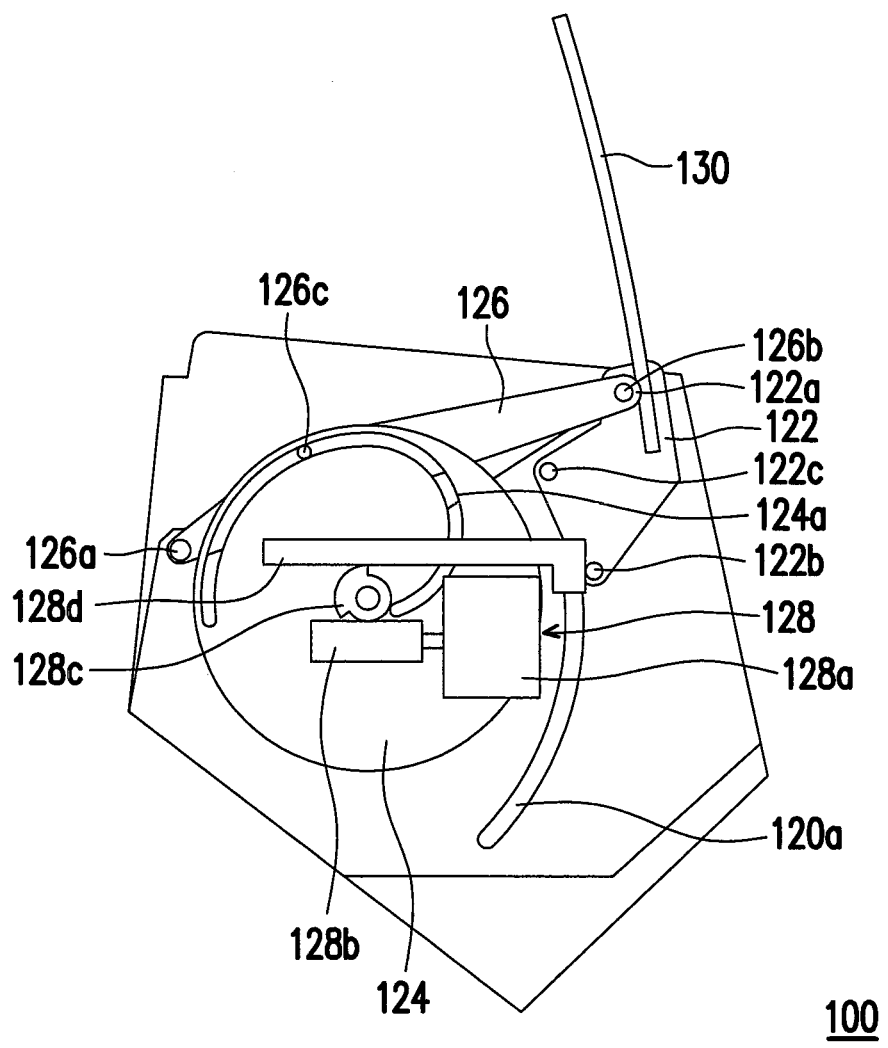
FIG. 2 is the side view of the kinematic positioning system with the driving unit.
Figure 4:
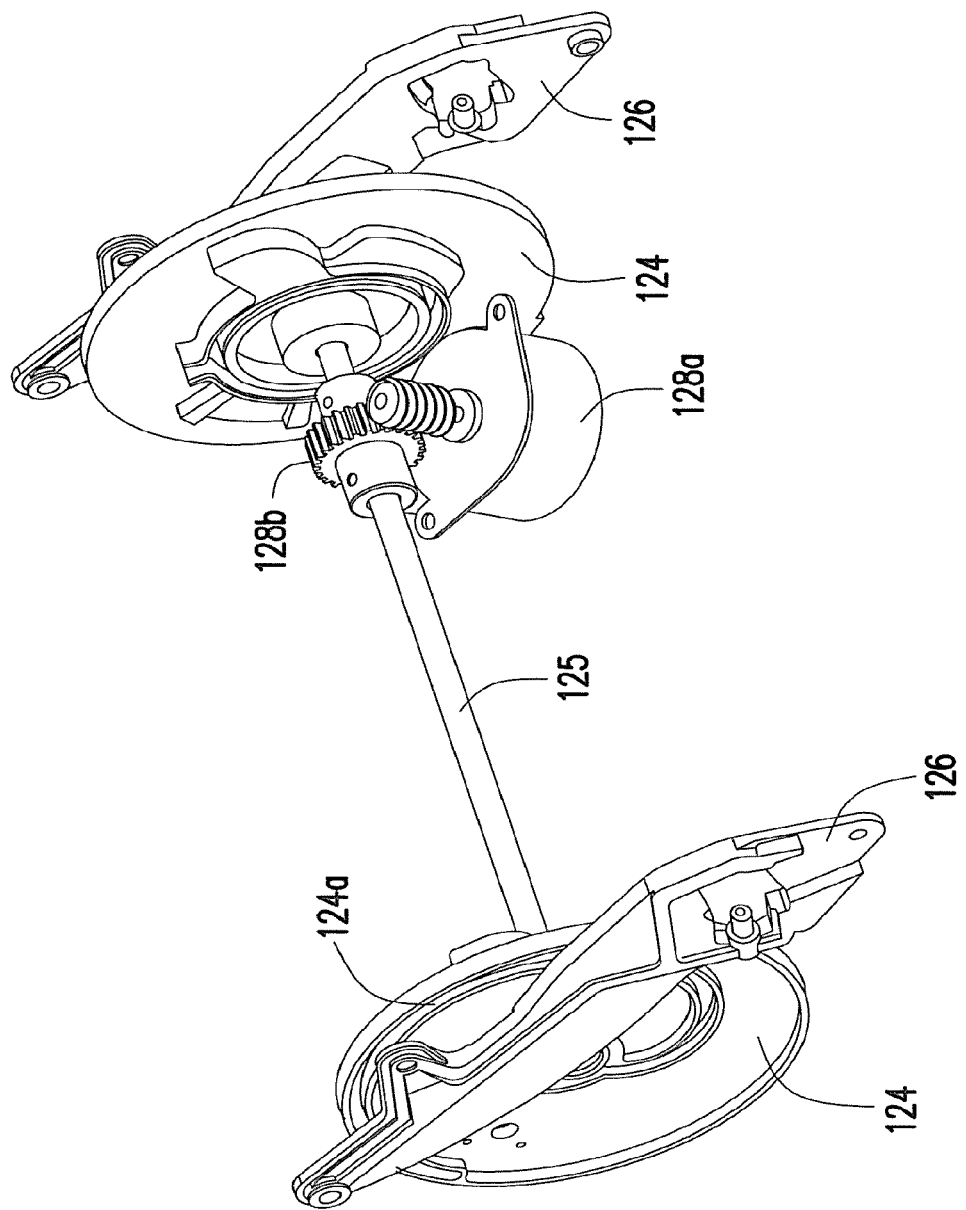
FIG. 4 illustrates the relationships of the shaft, worm gear and control disc.
Figure 5:
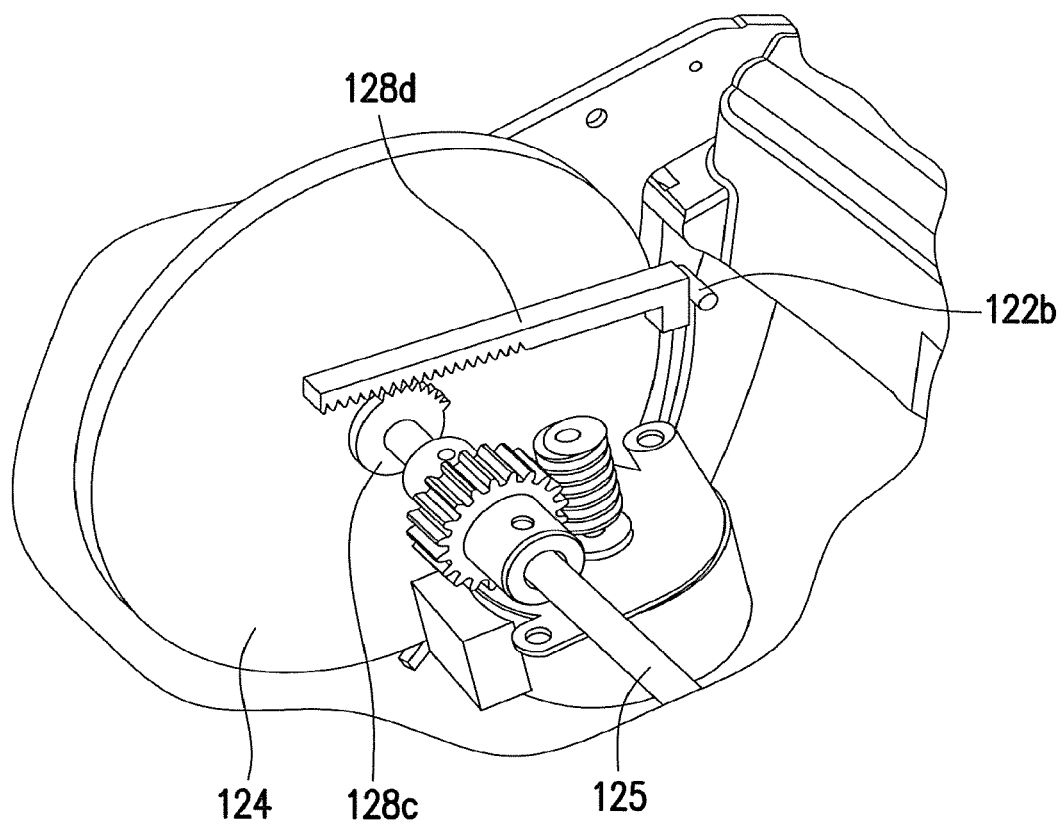
FIG. 5 illustrates the relationships of the gear wheel segment, gear rack and control disc.
Figure 6:
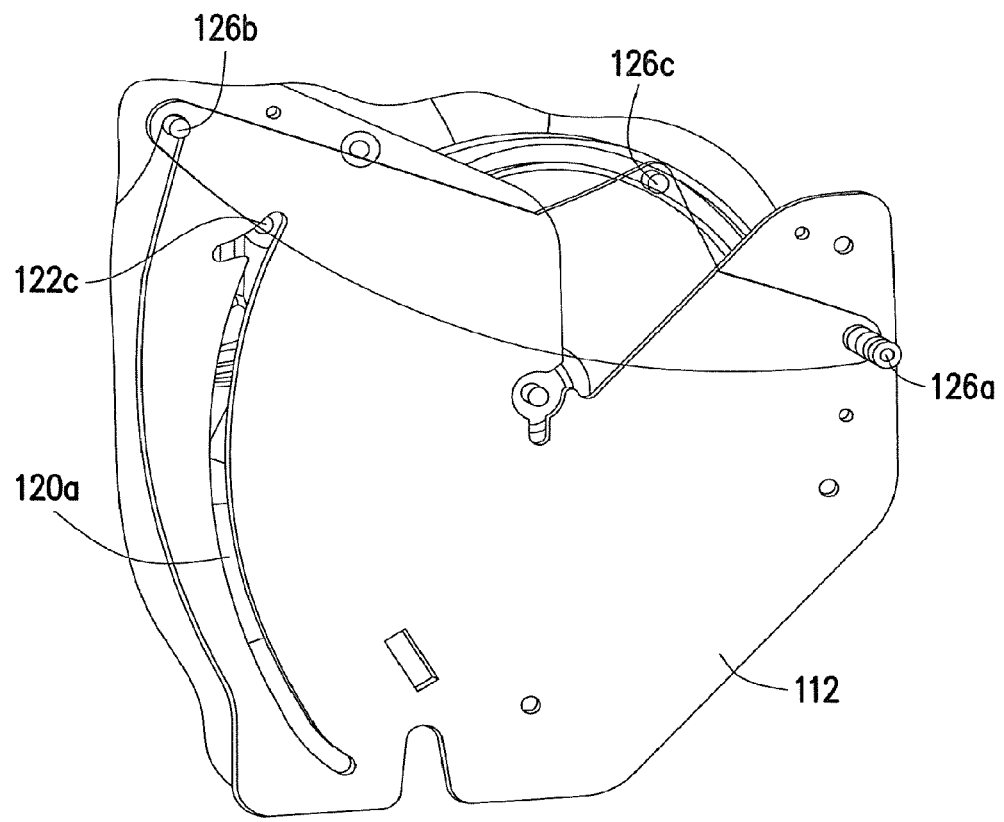
FIG. 6 is the side view of the fixing frame.

FIG. 2 is the side view of the kinematic positioning system with the driving unit. FIGS. 4-6 show the connections of the elements in the positioning system. The positioning system 100 arranged in the casing 110 includes a fixing frame 112 on the base 101 (FIG 1A). A lifting module 120 is disposed within the casing 110 and includes a combiner holder 122, a pair of control discs 124, a pair of levers 126 and a driving unit 128. The lifting module 120 is capable of doing a first movement between a first position where the combiner 130 is in a parking position (storage position) and a second position where the combiner 130 is in an operating position (display position), and a second movement for angular fine adjustment of the combiner 130 after reaching the operating position.

The lifting module 120 enables the first movement by lifting the combiner 130 with the lifting levers 126. The levers 126 are opposed from each other and each includes a first end 126a, a second end 126b and a pin 126c. The first ends 126a are rotatably mounted on the fixing frame 112 and the second ends 126b are connected to the combiner holder 122. It can be observed in FIGS. 1A and 1B that, as the combiner 130 moves from the parking position to the operating position, the levers 126 are one end (126a) remained and the other end (126b) moved close to the opening of the casing 110.

The combiner holder 122 is symmetrically designed and includes a pair of upper tips 122a, a pair of lower pins 122b and a pair of middle pins 122c. The upper tips 122a are fixedly attached to the bottom ends of the combiner 130 and together with the second ends 126b of the levers 126, while the middle pins 122c are movably connected to two guiding slots 120a on the fixing frame 112. The guiding slots 120a are symmetrically designed on the wall of fixing frame 112 for guiding the middle pins 122c to move along so that the combiner holder 122 can move steadily and smoothly. It can be seen from FIGS. 1A and 1B that the combiner holder 122 is transported from the first position to second position with a slight change of its angle. And from FIG. 1C, the combiner holder 122 is rotated to a certain angle for angular fine adjustment of the combiner 130.

The movement of the lifting levers 126 are controlled by the control discs 124. The control discs 124 are opposed from each other, arranged substantially vertical to the base 101 and respectively positioned adjacent to the levers 126. The shape of control discs 124 is not limited as a circle. Each of the control discs 124 includes a predetermined curve slot 124a implemented on the body of the control disc 124. Each of the levers 126 are connected with the control discs 124 by means of the pin 126c positioned in the predetermined curve slot 124a. subsequently, the pins 126c of the lifting levers 126 are adapted to move along the predetermined curve slots 124a to accomplish the first and second movements of the combiner 130. The predetermined curve slots 124a have to be designed corresponding to the path which leads the combiner 130 to move in the way of both first and second movements. Specifically, in FIG. 2, the predetermined curve slot 124a is designed that the curvature near the center of the control disc 124 is gradually decreased to the constant curvature at the outer peripheral of the control disc 124.

Referring now to FIGS. 2-6, the control discs 124 are rotated by the driving unit 128. The driving unit 128 is disposed on the fixing frame 112 between the control discs 124. A stepping motor 128a is used as the power source in this embodiment. The stepping motor 128a is equipped with a worm gear 128b. The worm gear 128b is assembled to a shaft 125 and rotatably connected to the inner side of the control disc 124. The control disc 124 has been configured to have a connecting part in the inner side to connect with the worm gear 128b. In addition, a power transmission device may be provided so that the worm gear 128b can rotate two control discs 124 simultaneously.

When the positioning system 100 is in the first position, as soon as the stepping motor 128a started, the worm gear 128b will drive the control discs 124 to rotate. As the control discs 124 rotate, the pins 126c will move along the predetermined curve slots 124a and the second ends 126b of the lifting levers 126 will lift the combiner holder 122. Then, the combiner 130 will be extended from the casing 110. If the driving unit 128 keeps operating, the combiner 130 will be fully extended to the operating position and be ready to use.

The driving unit 128 further comprises a gear wheel segment 128c and a gear rack 128d to accomplish the second movement. The gear wheel segment 128c is connected between the inner sides of the control discs 124 and the gear rack 128d. The gear rack 128d is disposed on a rail (not shown) of the fixing frame 112. The rail is adapted to engage the gear rack 128d so that the gear rack 128d is moving with one degree of freedom.

While the lifting module 120 reaches the operating position, the control discs 124 will continue to rotate by the stepping motor 128a, and the lifting levers 126 will keep in the position by the constant curvature of the predetermined curve slots 124a. Simultaneously, the gear wheel segment 128c gets in contact with the gear rack 128d and drives the gear rack 128d to move along the rails to hit the lower pin 122b of the combiner holder 122 so that the angle of the combiner 130 can be adjusted according to the angle of the combiner holder 122. Then, the angular fine adjustment movement can be accomplished.

Moreover, in an embodiment, the shaft 125 of the gear wheel segment 128c can be connected to the center of the control disc 124 and the worm gear 128b can be meshed with the gear wheel segment 128c so that the stepping motor 128a, worm gear 128b can rotate the control disc 124 directly. The shape of the gear wheel segment 128c is designed that only when the combiner 130 moves to the second position, the gear wheel segment 128c contacts and drives the gear rack 128d to accomplish the angular fine adjustment.

Figure 3:
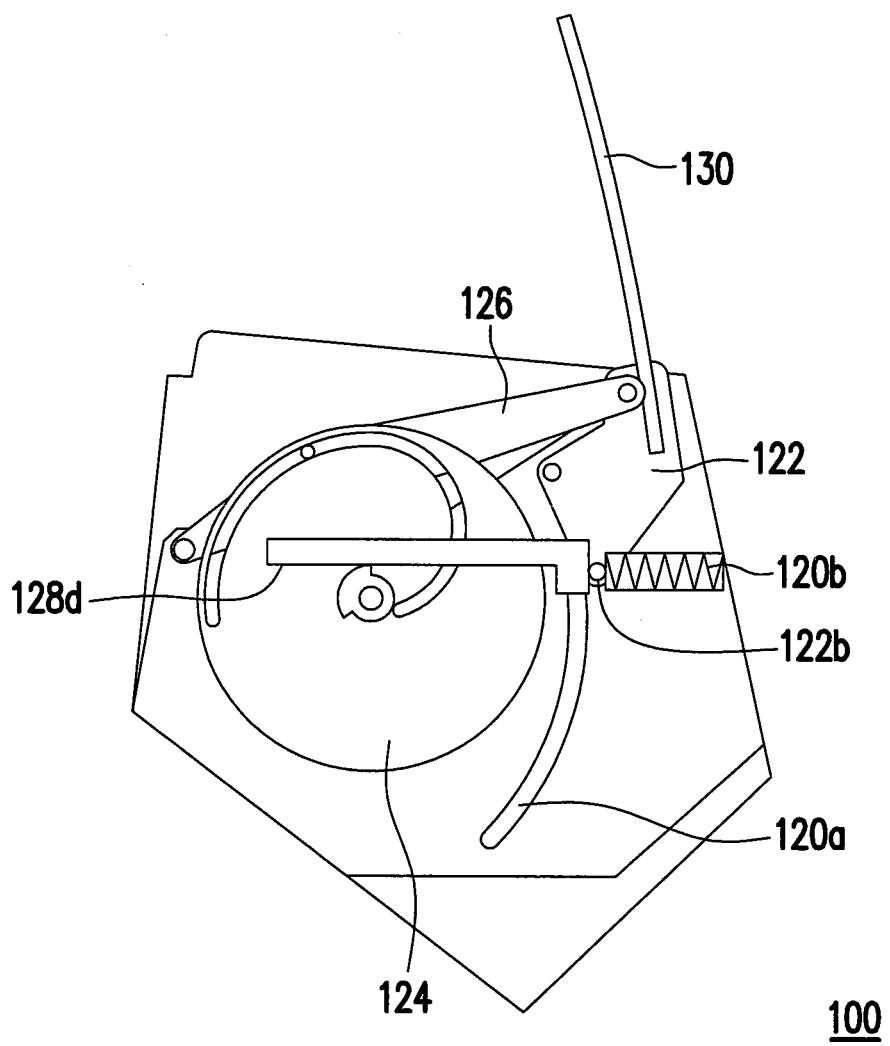
FIG. 3 is the side view of the positioning system.

In this embodiment, since gear wheel combinations are used to transmit force and motion between the components, backlash is also considerable. For offering a backlash free adjustment movement of the kinematic positioning system, the combiner holder 122 is further attached by a pair of springs 120b. As shown in FIG. 3, each of the springs 120b is fixedly attached between the fixing frame 112 and the lower pins 122b of the combiner holder 122. Accordingly, when the combiner holder 122 moves between the first and second movements, the springs 120b have been to follow the movements to realize backlash free adjustment movement.

When the combiner 130 is to be returned to the first position where it is in a storage position, the rotating direction of stepping motor 128a is reversed. The actions described above in FIGS. 1A-1C are performed in reverse orientation.

Finally, it should be noted that any suitable combination of components known now or in the future can be used for implementing a HUD system for use with the described kinematic positioning system 100. The present invention is not limited in this regard.

In summary, the constitution of the present invention developed a kinematic positioning system of a combiner for HUDs. The positioning system enables the combiner moving between parking position and operating position and angular fine adjustment. Only one driving unit is used though it is enable to choose separately the movement speed and the adjustment accuracy. Moreover, the present invention is designed compact because it requires only few parts and thus has the further advantage of small space necessary. For automobiles, it gives more freedom for design of dashboard and car interior.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A combiner positioning system, comprising:
a casing including a fixing frame on a base; and
a lifting module disposed within said casing and supporting a combiner, wherein said lifting module comprises a combiner holder, two control discs, two levers and a driving unit, wherein said combiner holder is connected to said combiner, said levers are connected to said combiner holder and said control discs, and said driving unit is connected to said control discs;
wherein when said driving unit drives said control discs to rotate, said levers move said combiner holder and said combiner,
wherein said lifting module enables a first movement between a first position where said combiner is in a parking position and a second position where said combiner is in an operating position, and a second movement for angular fine adjustment of said combiner after reaching said second position.

2. The combiner positioning system according to claim 1, wherein each lever has a first end, a second end and a pin.

3. The combiner positioning system according to claim 2, wherein said first end is rotatably mounted on said fixing frame, said second end is connected to said combiner holder and said pin is attached to said control disc.

4. The combiner positioning system according to claim 2, wherein said combiner holder includes two upper tips, two middle pins and two lower pins.

5. The combiner positioning system according to claim 4, wherein each of said upper tips of said combiner holder is fixedly attached to said combiner and said second end of each of said levers.

6. The combiner positioning system according to claim 4, wherein each of said lower pins of said combiner holder is movably connected to said fixing frame.

7. The combiner positioning system according to claim 4, wherein said fixing frame further comprises a pair of predetermined guiding slots adapted to connect said middle pins of said combiner holder.

8. The combiner positioning system according to claim 1, wherein each of said control discs is arranged substantially vertical to said base and a predetermined curve slot is formed thereon.

9. The combiner positioning system according to claim 8, wherein each of said levers is attached to said predetermined curve slot by a pin of said lever.

10. The combiner positioning system according to claim 1, wherein said driving unit is disposed on said fixing frame between said control discs and includes a stepping motor which is equipped with a worm gear.

11. The combiner positioning system according to claim 10, wherein said worm gear is assembled to a shaft and rotatably connected to said control disc.

12. The combiner positioning system according to claim 10, wherein said driving unit further comprises a gear wheel segment and a gear rack.

13. The combiner positioning system according to claim 12, wherein said gear wheel segment is connected between said gear rack and said control disc.

14. The combiner positioning system according to claim 12, wherein said combiner holder further comprises a lower pin which is adapted to be contacted by said gear rack.

15. The combiner positioning system according to claim 1, wherein said fixing frame further comprises a spring fixedly attached between said fixing frame and a lower pin of said combiner holder.

\* \* \* \* \*